United States Patent
Boys et al.

[11] 3,717,119
[45] Feb. 20, 1973

[54] VACUUM PROCESSING MACHINE FOR ALUMINIZING HEADLAMP REFLECTORS

[75] Inventors: Donald R. Boys; Ernest W. White, both of Anderson, Ind.

[73] Assignee: General Motors Corporation, Detroit, Mich.

[22] Filed: July 30, 1971

[21] Appl. No.: 167,755

[52] U.S. Cl. ..................................118/49, 198/19
[51] Int. Cl. .............................................C23c 13/10
[58] Field of Search............118/49, 49.1, 48, 49.5, 6, 118/50, 50.1, 423, 425, 500, 503; 198/19

[56] References Cited

UNITED STATES PATENTS

| | | | |
|---|---|---|---|
| 2,730,987 | 1/1956 | Nelson | 118/49 |
| 3,037,607 | 6/1962 | Highfield et al. | 198/19 |
| 3,086,882 | 4/1963 | Smith, Jr. et al. | 118/49.1 X |
| 3,469,560 | 9/1969 | Bukkila et al. | 118/49 X |

Primary Examiner—Morris Kaplan
Attorney—J. L. Carpenter et al.

[57] ABSTRACT

A vacuum processing machine for continuously aluminizing headlamp reflectors wherein a reciprocating transfer shuttle and a transverse transfer carriage cooperate to alternately shift finished and unfinished reflectors between a loading and unloading station at one end of the machine to a high vacuum processing chamber at the other end of the machine for application of an aluminized reflective coating. For each forward stroke of the transfer shuttle, unfinished reflectors are shifted toward the processing chamber through a plurality of holding chambers of progressively increasing vacuum. For each reverse stroke, finished reflectors are carried from the processing chamber through the holding chambers for exit to atmosphere at the unloading station.

6 Claims, 13 Drawing Figures

INVENTORS.
Donald R. Boys &
BY Ernest W. White
Peter D. Sachtjen
ATTORNEY

INVENTORS.
Donald R. Boys &
BY Ernest W. White
Peter D. Sachtjen
ATTORNEY

VACUUM PROCESSING MACHINE FOR ALUMINIZING HEADLAMP REFLECTORS

The present invention relates to an apparatus for transferring articles to a processing station on a continuous basis and, in particular, to a vacuum processing machine for continuously transferring unfinished reflectors to processing station for aluminizing and subsequently returning finished reflectors to the ambient environment.

Current production techniques for applying a reflective coating to articles such as headlamp reflectors involve placing the unfinished reflectors in a chamber, closing and sealing the chamber, evacuating the chamber to a high vacuum, and performing the reflectorizing process. Thereafter, the chamber is vented and opened, and the finished reflectors are removed. Quite obviously, the production rate with this method is directly related to the pump down time for evacuating the chamber plus the processing time for applying the reflective coating. Generally, the pump down time considerably exceeds the processing time.

In an effort to increase the production rate of such parts, dynamic systems using an air-to-air system transfer of parts have been proposed wherein the unfinished parts pass through a series of chambers to a processing station and, after processing, move through a separate series of chambers and exit the machine at atmospheric conditions. Typically, the unfinished parts are loaded onto a unidirectionally moving conveyor system and fed through progressively increasing vacuum chambers via pressure locks to a high vacuum chamber for the reflectorizing operation. The finished parts are then routed from the work chamber through a second series of chambers with increasing pressure environments for subsequent exit to the ambient environment. However, the multiplicity of serially connected chambers requires considerable length, and a large and complex vacuum system for maintaining the requisite vacuum conditions.

The present invention contemplates a vacuum processing machine wherein a single series of vacuum chambers are simultaneously used for introducing unfinished parts to the processing station and for removing finished parts to an unloading station. This feature is accomplished by a reciprocating transfer shuttle which extends through a plurality of longitudinally aligned, independently sealed chambers. The transfer shuttle includes carrier nests registering in its extended position and its retracted position with adjacent vacuum chambers. A transfer carriage at the work handling end and in each of the chambers transversely reciprocates at each end of the shuttle stroke to remove a finished article from the carrier nest to a holding platform from temporary storage and, at the same time, place an unfinished article on the carrier nest for advancement toward the processing station.

At the work processing station, the transfer carriage, during each forward stroke of the transfer shuttle, moves an unfinished article to one of two aluminizing stations and simultaneously loads a finished article onto the vacated carrier nest. During the reverse stroke of the transfer shuttle, the processing or aluminizing is performed on the reflector. At the end of the next forward stroke, the coated article is removed from the first aluminizing station and an unfinished article transferred to the second aluminizing station.

Thus, for each forward stroke of the shuttle, an unfinished part is carried forward for processing. For each reverse stroke, a finished part is carried away from the processing station. The net effect of this arrangement is to reduce the overall length of the processing machine by transferring finished and unfinished parts through common chambers for loading and unloading the parts at a common location. Thus, separate return chambers are not necessary thereby resulting in a large reduction of system length and associated equipment for maintaining the vacuums therewithin. Additionally, the production rate is solely controlled by the aluminizing rate and independent of the pump down time.

Accordingly, an object of the present invention is to provide an apparatus for bidirectionally transferring articles from a loading and unloading station at one end to a work station at the other end.

Another object of the present invention is to provide a processing machine wherein a reciprocating transfer mechanism shifts unfinished articles toward a processing chamber during the forward stroke and carries finished articles away from the processing chamber during the reverse stroke.

A further object of the present invention is to provide a processing machine for continuously aluminizing headlamp reflectors that has a production rate substantially independent of the pump down time.

Still another object of the present invention is to provide a vacuum processing machine wherein unfinished articles enter at ambient conditions and are transferred through a group of vacuum chambers to a processing station, and finished articles are returned to the ambient atmosphere through the same chambers along a reversely parallel path.

A further object of the present invention is to provide a vacuum processing machine for continuously transferring unfinished headlamp reflectors to an aluminizing station for treatment and subsequently returning the finished reflectors to an ambient environment wherein a reciprocating transfer shuttle accepts unfinished reflectors at one end of the machine and, during each forward stroke of the shuttle, sequentially advances the reflector along a series of vacuum holding chambers toward the aluminizing station while, during each reverse stroke, the transfer shuttle returns finished articles through the same holding chambers for ultimate exit at the entrance end of the machine.

These and other objects will be apparent to one skilled in the art upon reading the following detailed description, reference being made to the accompanying drawings showing a preferred embodiment in which:

Figure 1:
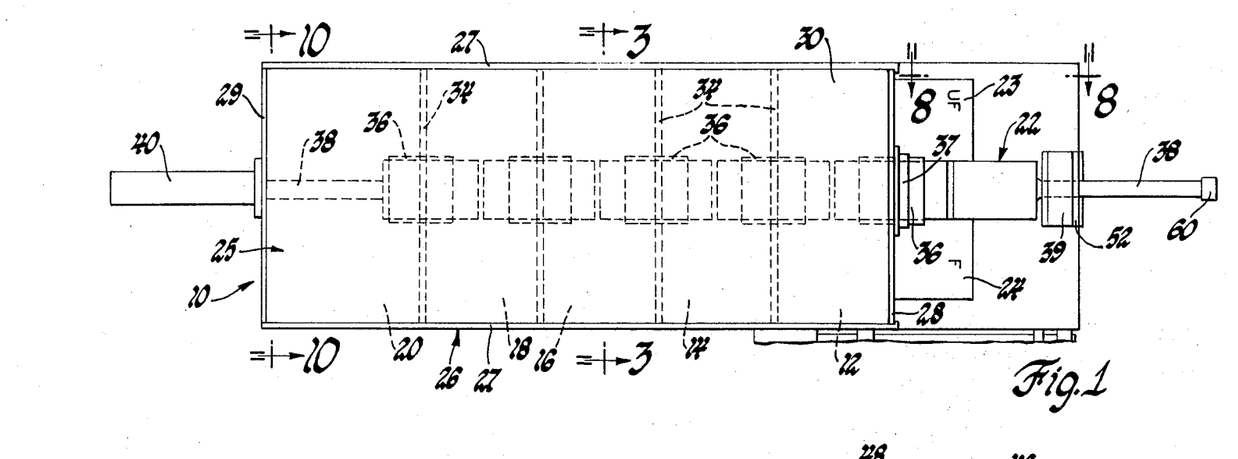
FIG. 1 is a plan view of a vacuum processing machine made in accordance with the present invention illustrated without the transfer carriage.
Figure 2:
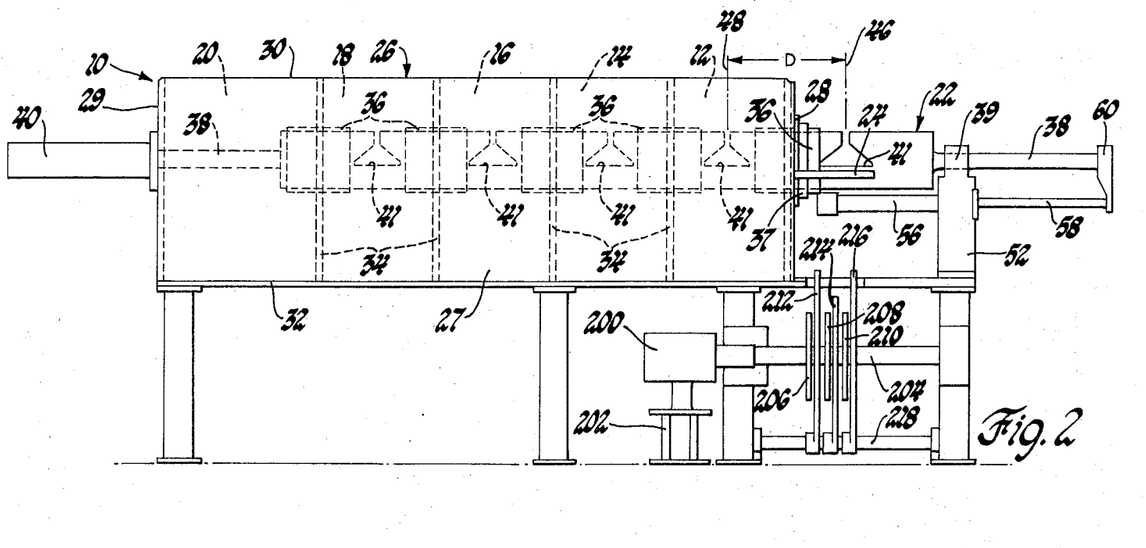
FIG. 2 is a side elevational view of the vacuum processing machine of FIG. 1.
Figures 3, 4:
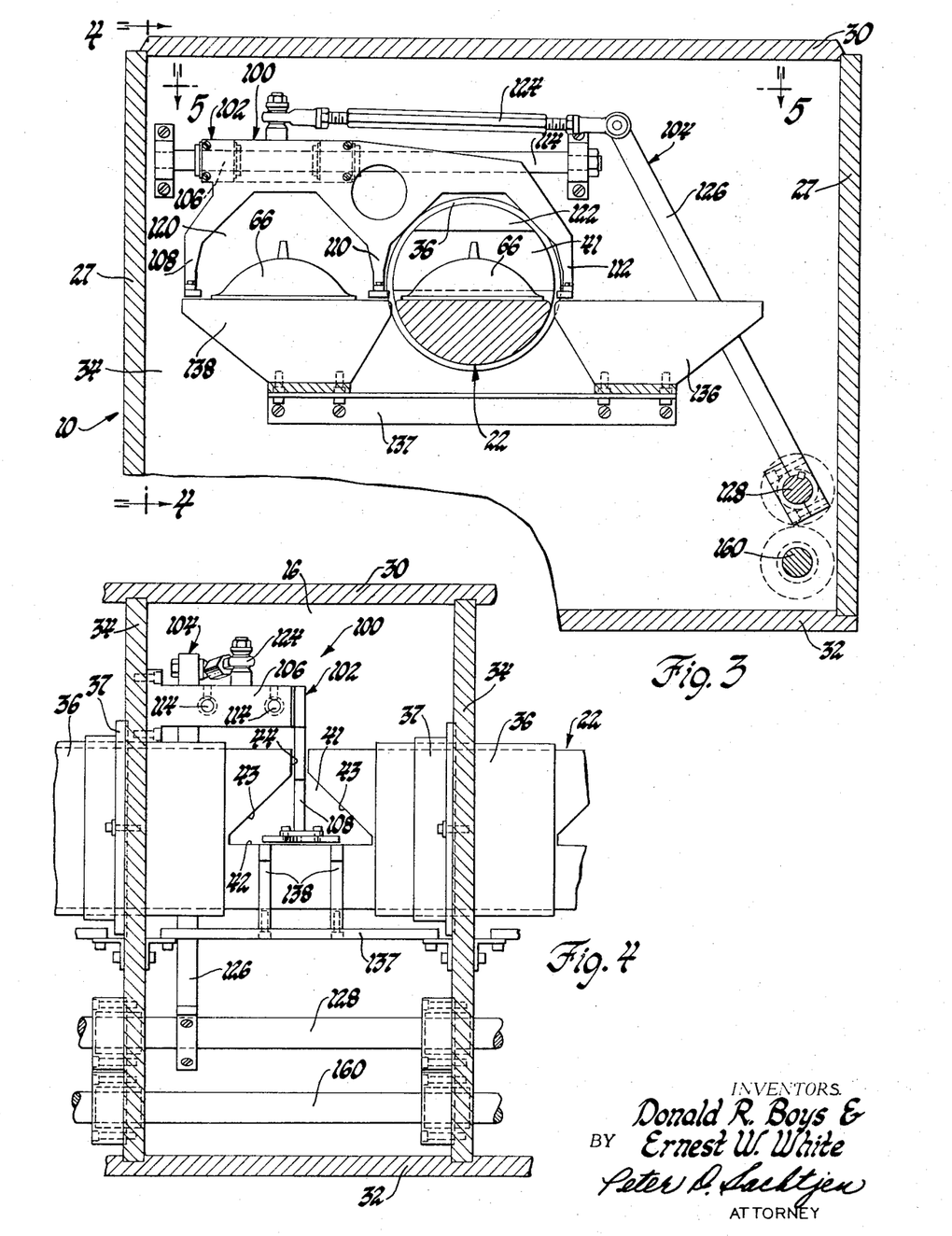
FIG. 3 is an enlarged view taken along line 3—3 of FIG. 1.
FIG. 4 is a view taken along line 4—4 of FIG. 3.

Referring to FIGS. 1 through 3, there is shown an air-to-air vacuum processing machine 10 comprising four serially connected longitudinally aligned vacuum holding chambers 12, 14, 16, 18, and a work processing chamber 20. In a manner hereinafter described, the machine 10 bidirectionally transfers finished and unfinished articles such as headlamp reflectors by means of a reciprocating transfer shuttle 22 between a loading station 23 and an unloading station 24 at the front end of the machine and a processing station 25 in the processing chamber 20.

Figure 5:
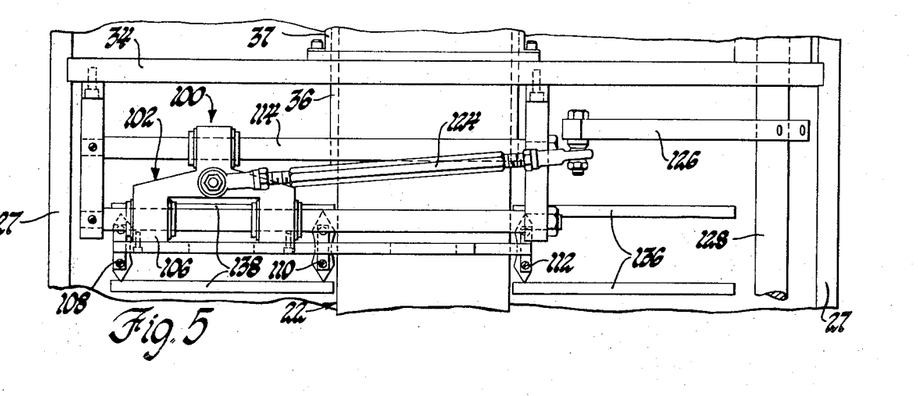
FIG. 5 is a view taken along line 5—5 of FIG. 3.

More specifically, the vacuum processing machine 10 includes a vacuum enclosure 26 having sidewalls 27, front and rear end walls 28, 29, and top and bottom walls 30, 32 respectively. The enclosure 26 includes transverse internal divider walls 34 which cooperate with the aforementioned walls to establish the holding and processing chambers. A plurality of coaxially aligned cylindrical support sleeves 36 extend through openings in the divider walls 34 and the end wall 28. As shown in FIGS. 4 and 5, the support sleeves 36 are fixedly mounted on the divider walls 34 by flanges 37.

Referring to FIGS. 1 and 2, the transfer shuttle 22 is reciprocably supported at intermediate positions by the sleeves 36 for bidirectional axial movement between an extended position and the illustrated retracted position. The shuttle 22 includes a pair of support shafts 38 at the the ends thereof which are supported by slide bearing assemblies 39, 40 positioned adjacent the stations 23, 24 and the station 25, respectively.

The transfer shuttle 22 is generally in the form of an elongated cylindrical piston and includes five transverse triangular carrier nests 41. As shown in FIG. 4, each carrier nest 41 includes a horizontal base 42 and converging sides 43 which terminate at an upwardly opening transverse slot 44. The nests 41 are of sufficient size to accommodate headlamp reflectors of varying sizes. The nests 41 are longitudinally spaced along the transfer shuttle 22 on the same centers as the center distance between the individual chambers. Thus, referring to FIG. 2 wherein the transfer shuttle 22 is shown in the retracted position, the centerline 46 of the entrance carrier nests 41 will advance a distance D to the centerline 48 of the chamber 12 during the forward stroke of the transfer shuttle 22. The remaining carrier nests will advance a distance toward the next adjacent chamber during the aforementioned stroke. At each extreme of movement, therefore, the carrier nests 41 will register and be transversely aligned with the centerlines of the respective chambers 12 through 20 inclusive.

The front support shaft 38 of the transfer shuttle 22 is reciprocably journaled by the aforementioned bearing 39 at a support block 52. A double-acting hydraulic cylinder 56 is mounted on the support block 52 and includes a forward projecting piston rod 58. The shaft 38 and the piston rod 58 are operatively interconnected by a cross member 60. The hydraulic cylinder 56 has a forward and reverse stroke equal to the distance D between centers of the carrier nests 41. Upon suitable energization, the hydraulic cylinder 56 will drive the transfer shuttle 22 between the illustrated retracted position and the extended position.

Figure 8:
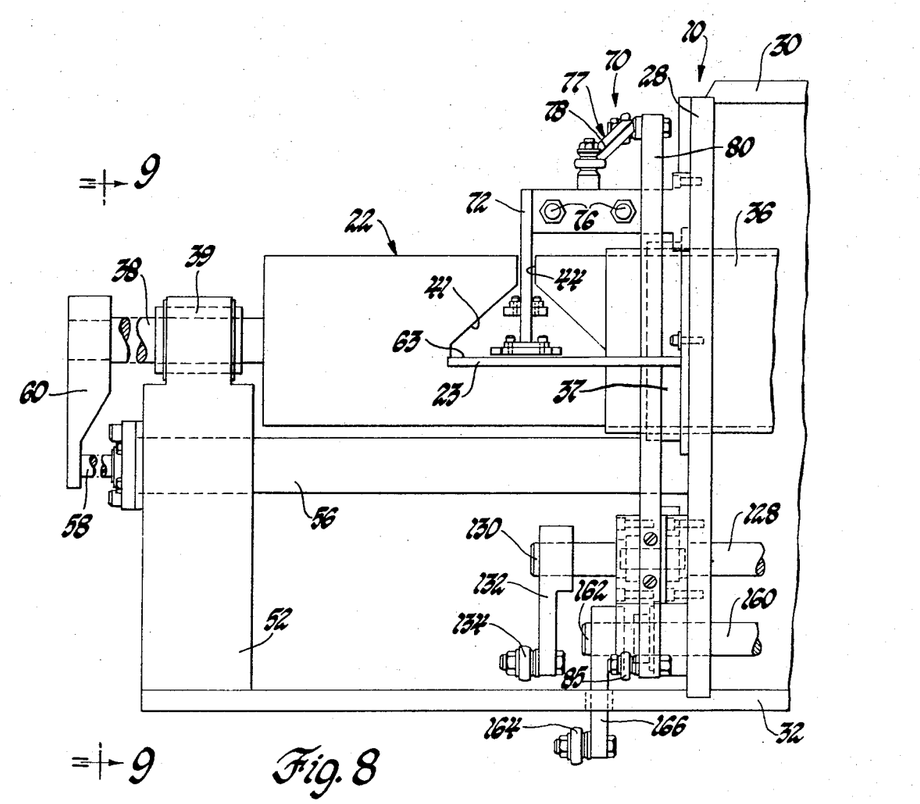
FIG. 8 is an enlarged view taken along line 8—8 of FIG. 1.
Figure 9:
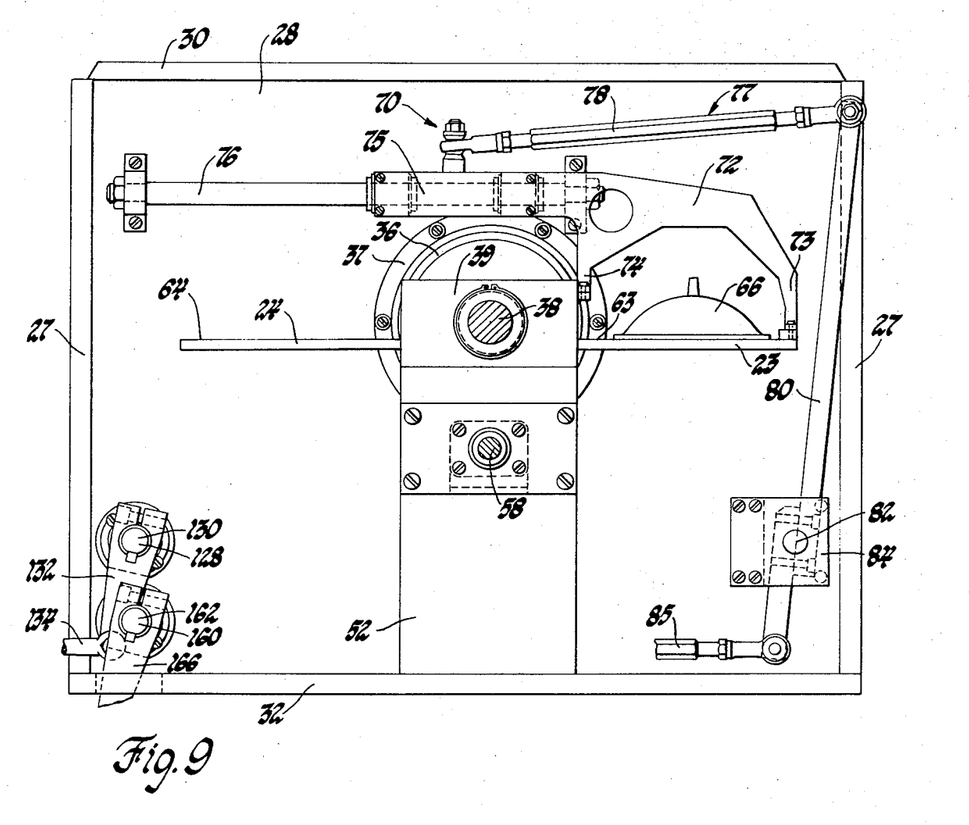
FIG. 9 is a view taken along line 9—9 of FIG. 8.

Referring to FIGS. 8 and 9, the unloading station 24 and the loading station 23 are transversely spaced on either side of the transfer shuttle 22 at the front end of the machine 10. Unfinished and finished parts are transferred to and from handling platforms 63 and 64 carried by the end wall 28. The subject machine is particularly adapted for aluminizing headlamp reflectors of the type shown in FIG. 7. Such a reflector 66 comprises a paraboloidal base 67 terminating with an annular peripheral rim 68 having a center exhaust tube 69. The reflector 66 is formed of glass and has an inner surface which receives a reflective coating in the manner hereinafter described. By means of a transfer carriage 70, unfinished reflectors are loaded onto a carrier nest 41 from the loading platform 63 while finished reflectors are transferred from the carrier nest 41 to the handling platform 64. The reflectors may be manually handled at the platforms 63, 64 or automatically handled by conventional devices such as a conveyor or indexing head.

The transfer carriage 70 comprises a transfer slide 72 including a pair of laterally spaced depending legs 73, 74 and a guide assembly 75 which is slidably supported for transverse reciprocating movement on a pair of guide bars 76. The transfer slide 72 is operatively connected at the guide assembly 75 to a drive linkage 77 including a tie rod 78 and a drive lever 80. The drive lever 80 is pivotally supported in an intermediate position by a shaft 82 carried on a bearing block 84 at the end wall 28. The lower end of the drive lever 80 is pivotally connected to a connecting rod 85 which is driven by a cam drive hereinafter described. For every stroke of the transfer shuttle 22, the cam drive reciprocates the transfer slide 72 with respect to the carrier nest 41.

In operation, the transfer slide 72 has a first position wherein both legs 73, 74 are positioned over the loading platform 63 and a second position wherein the leg 73, 74 are positioned on either side of the shuttle 22. More particularly, during initial transverse movement to the left as driven by the linkage 77, the leg 73 engages the rim of an unfinished reflector to shift the latter across the loading platform 63 and into the carrier nest 41. Concurrently therewith, the other leg 74 engages the reflector to move the latter from the carrier nest 41 to the unloading platform 64. During the forward stroke of the transfer shuttle 22, the transfer slide 72 dwells in the last mentioned position with the legs 73, 74 straddling the transfer shuttle 22. At the end of the forward stroke, the drive linkage 77 is actuated to shift the transfer slide 72 to the right for acceptance of an unfinished reflector and subsequent loading on the shuttle upon completion of the rearward stroke.

Referring to FIGS. 3 to 6, reflectors are shifted to and from the carrier nest 41, to the holding chambers 12 through 18 by transfer carriage 100. Each transfer carriage 100 generally comprises a transfer slide 102 and a drive linkage 104. The transfer slide 102 includes a guide assembly 106, and three downwardly depending workpiece engaging legs 108, 110, and 112. The guide assembly 106 is slidably supported on a pair of transverse guide bars 114 for transverse reciprocating movement with respect to the transfer shuttle 22. The legs 108, 110, and 112 are transversely spaced a distance greater than the diameter of the shuttle 22 and define therebetween a pair of work receiving openings 120 and 122.

The drive linkage 104 includes a tie rod 124 connected at one end to the guide assembly 106 and at the other end to a drive lever 126 which is supported on a drive shaft 128 which extends through the chambers 12 through 18. As shown in FIG. 8, the drive shaft 128 has an input end 130 projecting from the front end wall 28. A crank arm 132 is connected at one end to the input end 130 and at the other end to a connecting rod 134. By a cam operated drive hereinafter described, the crank arm 132 rotates the shaft 128 to drive the transfer carriage 100 between two positions.

Referring to FIGS. 3 through 5, a pair of vertical holding plates 136, 138 are supported on a stand 137 carried between the divider walls 34. The plates 136, 138 register with the sides of the carrier nest 41 and are adapted to support a reflector 66. In the illustrated first position, the opening 120 is positioned over the left or unfinished side holding plate 138 while the other opening 122 registers with the carrier nest 41 with the legs 110, 112, straddling the transfer shuttle 22. At the other position, the opening 120 registers with the carrier nest 41 with its legs 108, 110 straddling the transfer shuttle 22 while the other opening 122 is positioned over the right or finished side holding plates 136.

The cam drive means for the linkage 104 translates the slide 102 at the end of each transfer shuttle stroke. Thus, at the end of the reverse stroke and prior to the forward stroke of the transfer shuttle 22, the linkage 104 drives the transfer slide 102 to the right such that the central leg 110 shifts a finished reflector onto the holding plate 136 and the left leg 108 engages the rim of an unfinished reflector to move the latter from the holding plate 138 to the carrier nest 41. The slide 102 dwells in this position during the forward stroke of the transfer shuttle 22. At the end of the stroke, the drive linkage 104 shifts the slide 102 to the left and the central leg 110 moves the unfinished reflector onto the holding plate 138 and the aforementioned finished reflector from its holding position on the holding plate 136 to the carrier nest 41.

Figure 10:
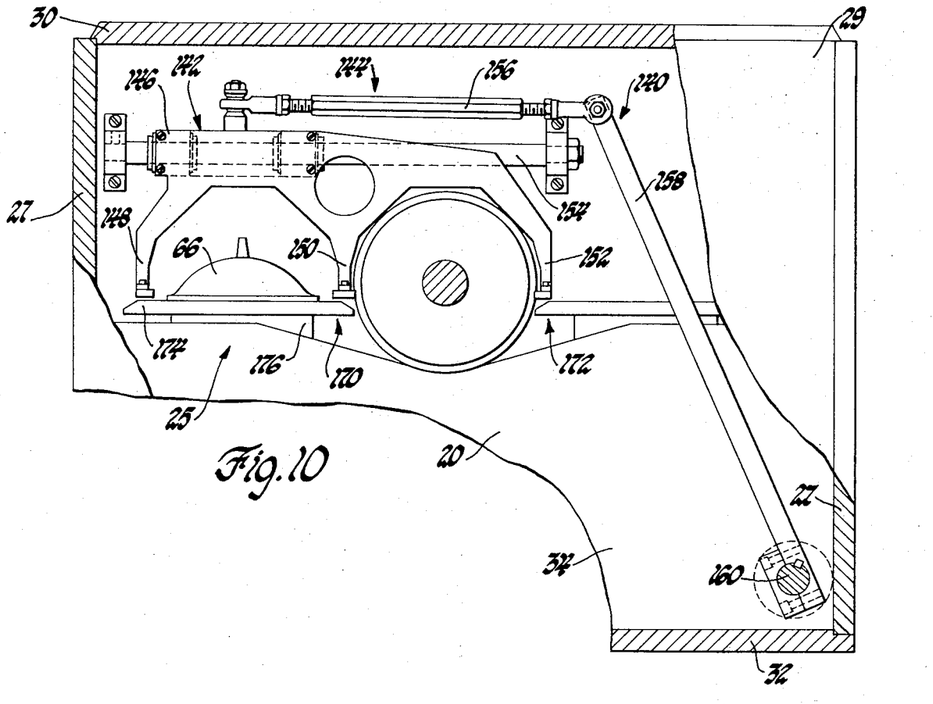
FIG. 10 is an enlarged view taken along line 10—10 of FIG. 1.

Referring to FIG. 10, the processing chamber 20 includes a transfer carriage 140 which is substantially identical to the aforementioned carriages 70 and 100. The carriage 140 comprises a transfer slide 142 and a drive linkage 144. The transfer slide 142 includes a guide assembly 146 and three downwardly depending workpieces engaging legs 148, 150, and 152 which are mutually transversely spaced a distance greater than the diameter of the shuttle 22. The guide assembly 146 is slidably supported on a pair of guide shafts 154 for transverse reciprocal movement with respect to the transfer shuttle 22. The drive linkage 144 includes a tie rod 156 pivotally connected at one end to a drive arm 158. The other end of the tie rod 156 is connected to the guide assembly 146. The lower end of the drive arm 158 is keyed to a shaft 160 which extends longitudinally through the chambers 12 through 20 and has an input 162 extending at the front of the machine (FIG. 8). The input 162 is operatively connected to a connecting rod 164 by a crank arm 166. The connecting rod 164 is operatively reciprocated by a cam drive (not shown) in a manner hereinafter described.

Figure 11:
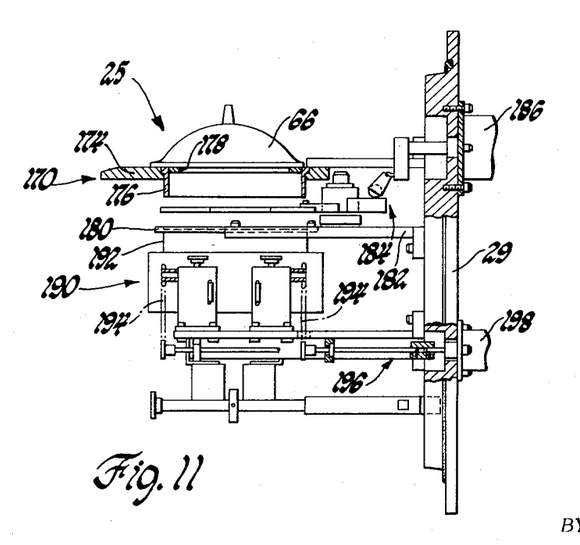
FIG. 11 is a view of the aluminizing station in the processing chamber.

Referring to FIGS. 10 and 11, a pair of aluminizing stations 170 and 172 are spaced on either side of the transfer shuttle 22. Both aluminizing stations are identical and a further description will be given with reference to the aluminizing station 170. More particularly, each aluminizing station includes an apertured processing platform 174 having a cylindrical sleeve 176 defining a circular aluminizing opening 178. A pivoting shield 180 is mounted on a support platform 182 carried on the side wall 29. A drive linkage 184 operatively connects the shield 180 to an air operated rotary actuator 186. Upon energization of the actuator 186, the linkage 184 pivots the shield 180 to cover or uncover the opening 178.

A resistance heated aluminizer 190 is supported on the platform 182 and includes a crucible 192 and a pair of wire feeding mechanisms 194, the latter of which serve to feed a supply of aluminum wire to the crucible 192 as regulated by drive means 196 including a motor 198.

The operation of the aluminizer 190 is basically conventional in that aluminum wire feed into the crucible 192 is melted and resistance heated so as to be vaporized. In the present instance, when an unfinished reflector is positioned over the opening 178, the shield 180 is pivoted away from the sleeve 176 and the aluminum vapor diffuses upwardly and coats the inner surface of the reflector 66 to thereby provide a reflective coating.

Unfinished reflectors are alternately transferred to the aluminizing stations 170, 172 as controlled by the transfer carriage 140. During each forward stroke of the transfer shuttle 22, an unfinished reflector is advanced toward the processing chamber 20. Assuming an unfinished reflector is located on the carrier nest 41 at the processing chamber 20, the linkage 144 will be automatically energized at the completion of the forward stroke. Thereupon, the slide 142 will be shifted to the left and the leg 150 will move an unfinished reflector onto the processing platform 174. The carriage 140 will dwell in this position during reverse stroke of the transfer shuttle 22. Concurrently therewith, the aluminizing stations 170 will be energized in the manner described above to apply a coating to the reflector.

In the present machine, the cycle time of the transfer shuttle 22 is equal the processing time for applying the coating to the cycle to the reflector. Therefore, the carriage dwells in this position during the reverse stroke and the subsequent forward stroke. At the end of the next forward stroke, the drive linkage 144 is actuated to shift the slide 142 to the right whereby leg 150 shifts a newly advanced unfinished reflector to the platform 172 and the leg 148 shifts a coated reflector onto the carrier nest 41. In other words, the carriage 140 operates at one-half the frequency of the transfer carriages 70 and 100.

Referring to FIG. 2, the drive means for the carriages comprises an electric motor 200 mounted on a pedestal 202 connected to the base of the machine. A drive shaft 204 carries three output cams 206, 208 and 210 and is operatively connected to the output of the motor 200. The cams 206, 208 and 210 respectively operatively engage three follower arms 212, 214, and 216 which are pivotally connected at their lower ends to a shaft 218. The upper ends of the follower arms 212, 214, 216 are respectively operatively connected with the connecting rods 85, 134, 164 which operate the drive shafts of the transfer carriages 70, 100, 140.

Figures 6, 7:
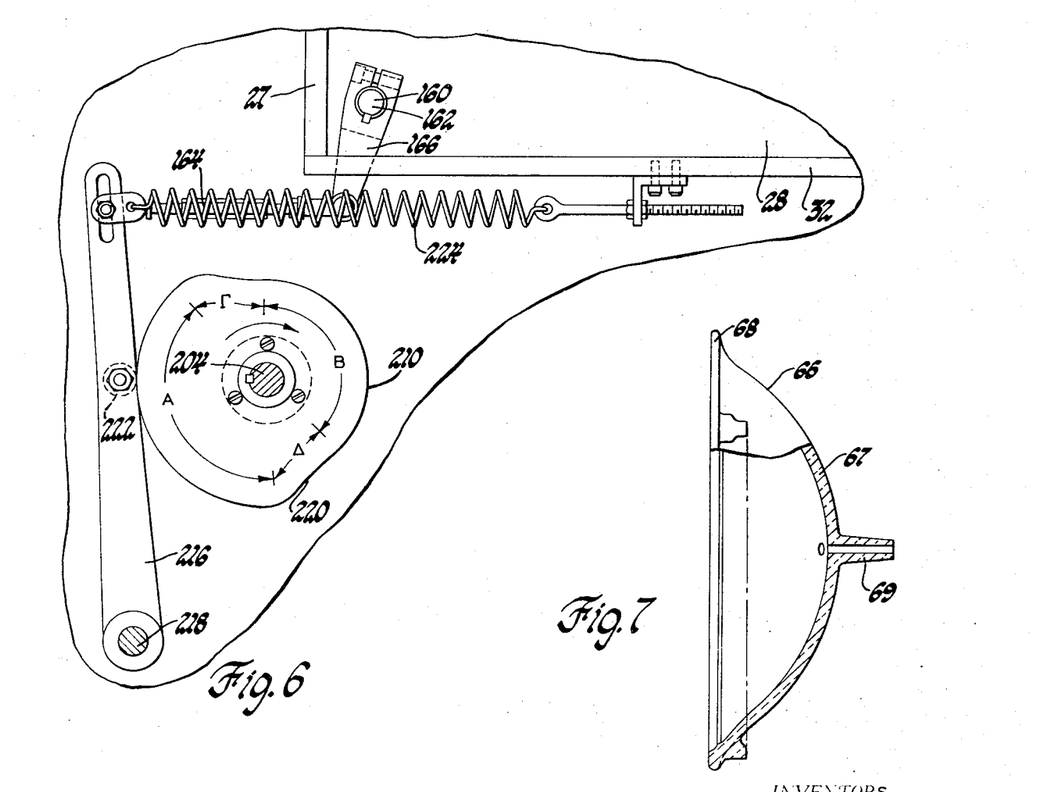
FIG. 6 is an enlarged view of the cam drive for the transfer carriage.
FIG. 7 is a partially sectioned view of a headlamp reflector.

Referring to FIG. 6, wherein the cam drive for the processing chamber is shown, the cam 210 includes a rise and fall cam surface 220. The follower arm 216 includes a follower pin 222 which is continuously biased against the cam surface 220 by a tensioned spring 224 extending between the upper end of the arm 216 and the bottom wall 32. The cam surface 220 comprises dwell sectors letter A (Alpha) and B (Beta) corresponding to the dwell time of the transfer slide 142 over the processing stations 170, 172 and intermediate actuating sectors $\Gamma$ (Gamma) and $\Delta$ (Delta) having gradually changing cam profiles which translate the carriage 140 between the aforementioned positions during dwell time of the transfer shuttle 22.

More specifically, the output speed of the shaft 160 is equal to the cycle time of the transfer shuttle 22. The dwell time presented by the sectors A and B is equal to the stroke time of the transfer shuttle. The time presented by the actuating sectors $\Delta$ and $\Gamma$ is equal to the dwell time of the transfer shuttle 22. Accordingly, during rotation of the cam 210 through sector A, the follower arm 216, the connecting rod 164 and the shaft 160 remain stationary with a reflector being positioned at an aluminizer 190. As the follower pin traverses sector $\Delta$, the crank arm 166 is pivoted counterclockwise under the influence of spring 224 thereby rotating shaft 160 in the same direction. This rotates the linkage 144 to the right (FIG. 10) thereby shifting a finished reflector onto the carrier nest 41 and a newly advancing unfinished reflector onto the processing station 172. During sector B, the transfer shuttle 22 reciprocates through a rearward stroke and forward stroke while a coating is applied at station 172. During sector $\Gamma$ the cam 210 will drive the follower arm 216 and the crank arm 166 in a clockwise direction thereby shifting the slide assembly to the left. This action removes a coated reflector from the station 172 to the carrier nest 41 and shifts the uncoated reflector from the carrier nest 41 to the station 174.

Inasmuch as the carriages for the holding chambers 12 through 18 and the loading and unloading stations 23, 24 operate at twice the frequency of the processing chamber 20, a two cycle rise and fall cam profile is provided for these cams. Accordingly, the cams will have the four dwell sectors each corresponding to the stroke time of the shuttle 22. The two rise and the two fall sectors will each correspond to the dwell time of the transfer shuttle 22. For achieving this interaction, conventional control means are provided to coordinate the operation of the hydraulic cylinder 56 and the electric motor 200.

Figure 12:
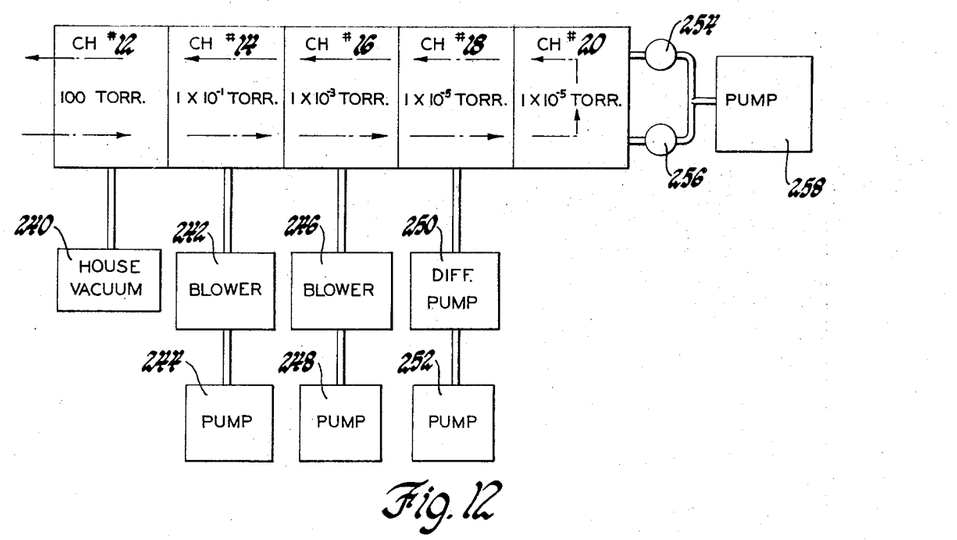
FIG. 12 is a schematic vacuum pumping diagram for the vacuum processing machine.

The vacuum system for the aluminizing machine 10 is shown in FIG. 12 wherein the designated pumping equipment is attached to the individual chambers through appropriate porting and piping. More specifically, the initial pump down of all the chambers and maintenance of chamber 12 is provided by a house vacuum supply 240. The chamber 14 is provided with centrifugal blower 242 in series with a mechanical vacuum pump 244. The chamber 16 is provided with centrifugal blower 246 in series with mechanical vacuum pump 248. Chamber 18 is provided with a diffusion pump 250 and a mechanical vacuum pump 252. The vacuum in processing chamber 20 is maintained by a pair of parallel diffusion pumps 254 and 256 connected in series with a vacuum pump 258. Preferably, the aforementioned pumping equipment should be designed to provide the following environmental conditions:

| STATION | VACUUM |
| --- | --- |
| Chamber 12 | 100 Torr |
| Chamber 14 | $1 \times 10^{-1}$ Torr |
| Chamber 16 | $1 \times 10^{-3}$ Torr |
| Chamber 18 | $1 \times 10^{-5}$ Torr |
| Chamber 20 | $1 \times 10^{-5}$ Torr |

Figure 13:
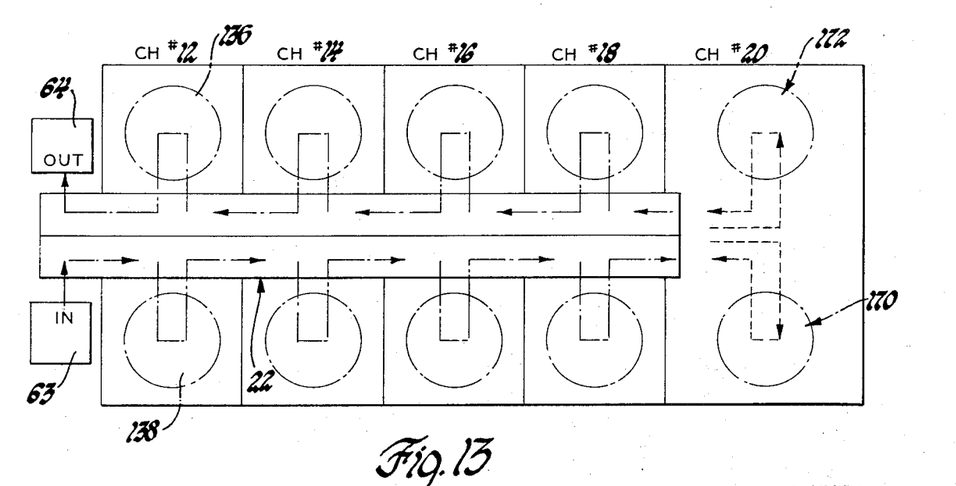
FIG. 13 is a schematic flow diagram showing the routing of reflectors through the vacuum processing machine.

The routing of reflectors through the machine is shown in FIG. 13 wherein parts are processed by sequential entry of unfinished parts from the loading platform 63 to the transfer shuttle 22. At the end of each reverse stroke, the transfer carriage 70 shifts an unfinished reflector to the end carrier nest 41 on the transfer shuttle 22. The transfer shuttle 22 then reciprocates forwardly to its extended position at which time the holding chamber transfer shuttle 100 shifts the unfinished reflector to a storage or holding position on the platform 138 where it remains during the reverse shuttle stroke. At the end of this stroke, the transfer shuttles 70, 100 are jointly actuated to shift unfinished reflectors from the platforms 63 and 138 onto the carrier nest 41. The aforementioned sequence is sequentially repeated until unfinished reflectors are resting on each platform 138. During the next forward stroke of the transfer shuttle 22, the unfinished reflector is deposited on a pedestal at one of the aluminizing stations 170, 172. As previously mentioned, during the subsequent reverse and forward strokes, a reflective coating is applied to the unfinished reflector. Concurrently, during the last mentioned forward stroke, another unfinished reflector is shifted from chamber 18 toward the other processing chamber 20. At the end of this stroke, the carriage 140 is actuated to remove the coated reflector to the carrier nest 41 and the advancing unfinished reflector to the other aluminizing station. During the next reverse stroke, the coated reflector is carried toward chamber 18 and at the end thereof is shifted to the holding platform 136 while unfinished reflectors are advanced to the carrier nest from the opposite platform 136. Thereafter, finished reflectors are sequentially advanced toward the unloading platform 64 during each reverse stroke of transfer shuttle 22 and during each forward stroke, unfinished reflectors are moved toward the processing station 20. Thus, the finished and unfinished reflectors bidirectionally shift along the machine in parallel paths for processing at one end and common exit and entry at the other end.

In the subject system, the largest cause of variance in environmental pressure conditions results from fluid flow due to the volume of the carrier nest 41. However, the sizes of the nests 41 are sufficiently small in comparison with the volume of the chambers so that this fluid transfer does not materially affect the environmental conditions in the chambers. Accordingly, the processing chamber is maintained at a vacuum suitable for continuous processing such that coating may begin immediately upon arrival of unfinished parts. Therefore, the production rate of the machine is independent of pump down time and proceeds solely in accordance with the aluminizing time.

Although only one form of this invention has been shown and described, other forms will be readily apparent to those skilled in the art. Therefore, it is not intended to limit the scope of this invention by the embodiment selected for the purpose of this disclosure but only by the claims which follow.

What is claimed is:

1. A transfer apparatus for advancing articles toward and retreating articles from a processing operation comprising: a support member; a plurality of stations on said support member including a handling station at one end and a processing station at the other end associated with the processing operation; a shuttle member extending between said stations; means for moving the shuttle member between a first position and a second position; carrier means associated with the shuttle member for accommodating said articles, one of said carrier means registering with said handling station at said first position for receiving unprocessed articles and for discharging processed articles, another of said carrier means registering with said processing station at said second position for discharging unprocessed articles for a processing operation and receiving processed articles, and intermediate carrier means alternately registering with adjacent stations at said positions for receiving and discharging articles; first transfer means at said processing station operable at said second position to discharge unprocessed articles from and to load processed articles on said carrier means; second transfer means at the other of said stations, said second transfer means operable at said first position to discharge unprocessed articles from and to load processed articles on said carrier nests, said second transfer means operable at said second position to discharge unprocessed articles from and to load processed articles on said carrier means whereby unprocessed articles are alternately advanced along said stations to said processing station during movement to said second position and processed articles are alternately retreated from said processing station along said stations in a reversely parallel path during return movement to said first position.

2. An apparatus for processing articles comprising: means forming a plurality of interconnected chambers and having an ambient handling station at one end and a pressure regulated processing station at the other end; passage means extending between said chambers; first transfer means slidably received in said passage means; means for imparting a forward stroke and a reverse stroke to said first transfer means; means connected to said chambers for maintaining predetermined pressure conditions therewithin; carrier means associated with said first transfer means for accommodating said articles, one of said carrier means registering with said handling station at the end of said reverse stroke for receiving unprocessed articles and dispensing processed articles, another of carrier means registering with said processing station at the end of said forward stroke for presenting unprocessed articles for a processing operation and receiving processed articles; and second transfer means in said chambers operatively associated with said first transfer means, said second transfer means being operable after said forward stroke to transfer unprocessed articles to holding positions in said chambers and to transfer processed articles to said carrier means, said second transfer means being operable after said reverse stroke to transfer unprocessed articles from said holding positions to said carrier means and to transfer processed articles from said carrier means to said holding positions whereby articles are alternately advanced for processing and unloading during each stroke of said first transfer means.

3. A continuous vacuum processing apparatus for applying a coating to an article, comprising: an enclosure having a series of chambers; passage means defining an entrance and interconnecting said chambers; pumping means communicating with the chambers for evacuating the latter to a predetermined pressure; a piston member slidably supported in said passage means and extending between the chambers; means for reciprocating said piston member relative to the chambers between an extended position and a retracted position; a work station at a chamber remote from said entrance including means for applying said coating to an uncoated article; nesting means on said piston member aligned and registering with the chambers at said extended position and said retracted position, one of said nesting means being exposed to atmosphere beyond said entrance at said retracted position for receiving thereat an uncoated article and dispensing therefrom a coated article; transfer means in said chambers operable at said retracted position to shift coated articles from said piston member and shift uncoated articles onto said nesting means, said transfer means being operable at said extended position to shift uncoated articles from said nesting means to said work station and to simultaneously shift coated articles onto said nesting means, whereby articles are continuously routed to and from said work station during each movement of said piston member.

4. A vacuum processing machine for processing articles on a continuous basis, comprising: an enclosure having an enclosed processing end and an exposed handling end; a plurality of interconnected chambers in said enclosure including a processing chamber at said processing end; means connected to said chambers for maintaining a series of predetermined pressure conditions therewithin; passage means extending through said chambers; a shuttle member slidably received in said passage means; means for imparting a forward stroke and a reverse stroke to said shuttle member; a plurality of carrier nests associated with said shuttle member for accommodating said articles and being spaced complementary to said chambers, one of said carrier nests being exposed to atmosphere at said handling end when the shuttle member is at the end of said reverse stroke for receiving unprocessed articles and for discharging processed articles, another of carrier nests being in said processing chamber when the shuttle member is at the end of said forward stroke for presenting the unprocessed articles to a processing operation; transfer means associated with the shuttle member and operable after said forward stroke to shift unprocessed articles to said chambers and simultaneously shift processed articles to said carrier nests, said means being operable after said reverse stroke to shift said processed articles to said chambers and simultaneously shift unprocessed articles to said carrier nests, whereby said unprocessed articles are sequentially moved between chambers to said processing chamber during said forward stroke and processed articles removed therefrom in reverse sequence during said reverse stroke for discharge at said handling end.

5. An air-to-air vacuum processing machine for applying a reflective coating for headlamp reflectors, comprising: a vacuum enclosure having a plurality of longitudinally aligned holding chambers; a work processing station in the holding chamber at one end of said enclosure; a reflector handling station at the other end of the enclosure; vacuum pumping means fluidly connected to each of said chambers for providing a series of controlled environments having progressively increasing vacuums in the direction of said work processing station; a longitudinal passage in said enclosure extending from said reflector handling station to said work processing station; a cylindrical transfer shuttle slidably received in said passage for bidirectional longitudinal movement; means operably connected between the enclosure and the transfer shuttle for reciprocating the latter between a retracted position and an extended position; a plurality of transverse carrier nests formed in said transfer shuttle and adapted for transporting said reflectors, said carrier nests being longitudinally spaced complementary to said chambers with said one of said carrier nests registering with said reflector handling station at said retracted position and another of said carrier nests registering with said work processing station at said extended position, said shuttle including intermediate carrier nests registering with successive chambers at said shuttle positions; first transfer carriage means at said reflector handling station and operative transversely with respect to said transfer shuttle at said retracted position to shift reflectors to and from the carrier nest; support means in each of said holding chambers adapted to receive and store reflectors; second transfer carriage means in said holding chambers and operative transversely with respect to said transfer shuttle at both of said shuttle positions to shift reflectors between said holding stations and said carrier nest thereby alternately moving coated and uncoated reflectors into and out of the control of said transfer shuttle; a pair of coating stations at said work processing station operable to apply a reflective coating to said reflectors; third transfer carriage means in said work processing chamber and operative transversely with respect to said transfer shuttle at said extended position for alternately shifting reflectors to and from said coating stations whereby coated and uncoated reflectors are alternately shifted in reverse paths along said machine.

6. A vacuum processing machine for applying a reflective coating to headlamp reflectors on a continuous basis, comprising: a vacuum enclosure having a plurality of serially connected longitudinally aligned holding chambers including a terminal work processing chamber at one end thereof; vacuum pumping means fluidly connected to each of said chambers for maintaining a series of environments having progressively increasing vacuums from said handling end to said work processing chamber; a loading station and an unloading station transversely spaced at the end of said enclosure remote from said work processing chamber; a series of longitudinally aligned openings in said enclosure defining a longitudinal passage extending from between said loading and unloading stations to said work processing chamber; a cylindrical transfer shuttle slidably received in said passage for bidirectional longitudinal movement relative to said chambers, an hydraulic cylinder operably connected between said enclosure and said transfer shuttle for reciprocating the latter between an extended position and a retracted position; a plurality of transverse carrier nests formed in said transfer shuttle adapted to transport said reflectors and being longitudinally spaced complementary to said chambers, wherein a carrier nest at one end of the transfer shuttle registers with said loading and unloading stations at said retracted position and a carrier nest at the other end registers with said work processing chamber at said extended position, the intermediate carrier nests registering with successive chambers at said extended and retracted positions; a first transfer carriage slidably supported at said loading and unloading stations for transverse movement with respect to said transfer shuttle to shift a coated reflector from the carrier nest to the unloading station and to simultaneously shift an uncoated reflector from the loading station to the carrier nest; drive means connected to said first transfer carriage for translating the latter at said retracted position and for returning said first transfer carriage at said extended position; first and second support means in each of said holding chambers on opposite sides of the transfer shuttle for receiving and temporarily storing reflectors; a second transfer carriage slidably supported in said each of said holding chambers for transverse movement with respect to said carrier nests; drive means connected to said second transfer carriage for reciprocating said transfer carriage to a first position at said extended position for shifting uncoated reflectors to said first support means and for simultaneously shifting coated reflectors from said second support means to said carrier nests, said drive means reversely shifting said second transfer carriage to a second position at said retracted position for shifting uncoated reflectors to said carrier nests and coated reflectors to said second support means; first and second coating stations in said work processing chamber on either side of said transfer shuttle operable to apply a reflective coating to said reflectors; a third transfer carriage slidably supported at said work processing chamber for transverse reciprocal with respect to said transfer shuttle; drive means for reciprocating said third transfer carriage at said extended position to shift uncoated reflectors to said first coating station from said carrier nest and simultaneously shift coated reflectors from said second coating station to said carrier nest, said third transfer carriage operable at the succeeding extended position to shift uncoated reflectors to said second coating station and coated reflectors from said first coating station whereby, during each stroke of the transfer shuttle, reflectors are alternately shifted in reverse paths toward the processing chamber for coating and toward the loading station for exit to atmosphere.

* * * * *